May 19, 1964     A. L. BURNETT     3,133,420
METHOD OF DRY-DOCKING A SHIP AND DRY DOCK THEREFOR
Filed April 6, 1960     7 Sheets-Sheet 5
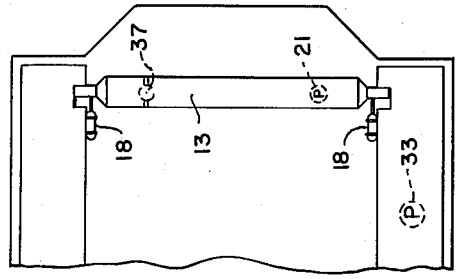
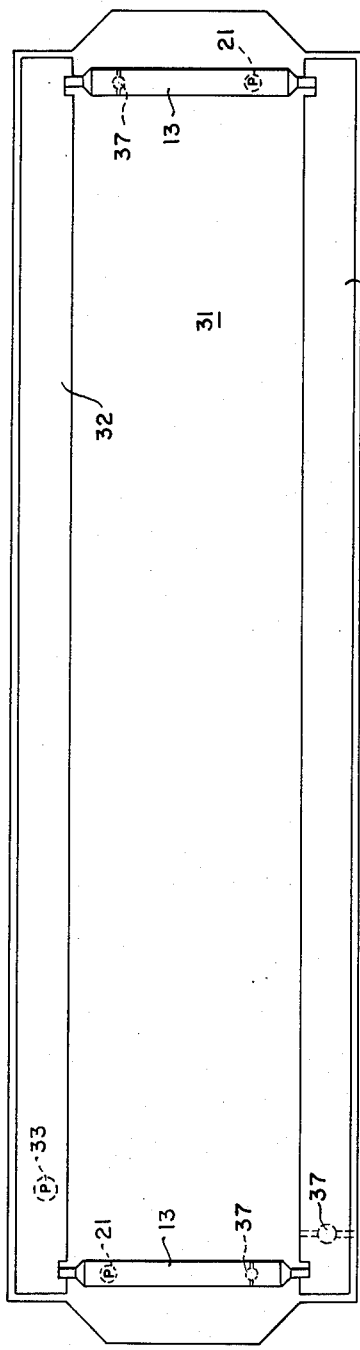
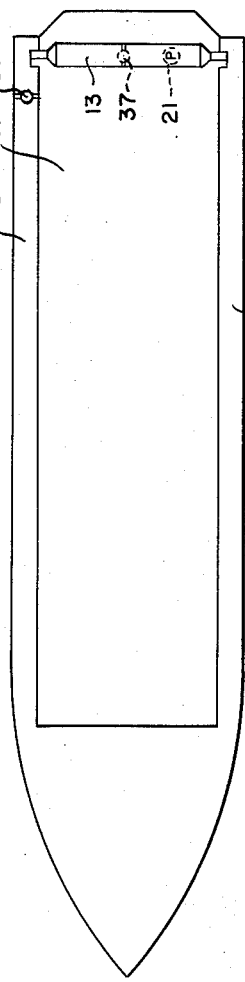
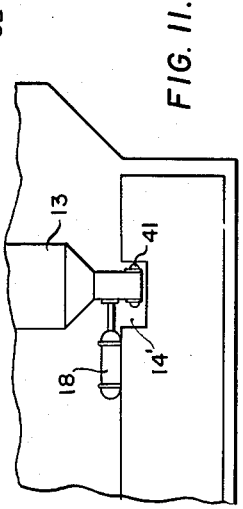
INVENTOR
A. L. BURNETT
BY
ATTORNEYS May 19, 1964     A. L. BURNETT     3,133,420
METHOD OF DRY-DOCKING A SHIP AND DRY DOCK THEREFOR
Filed April 6, 1960     7 Sheets-Sheet 6

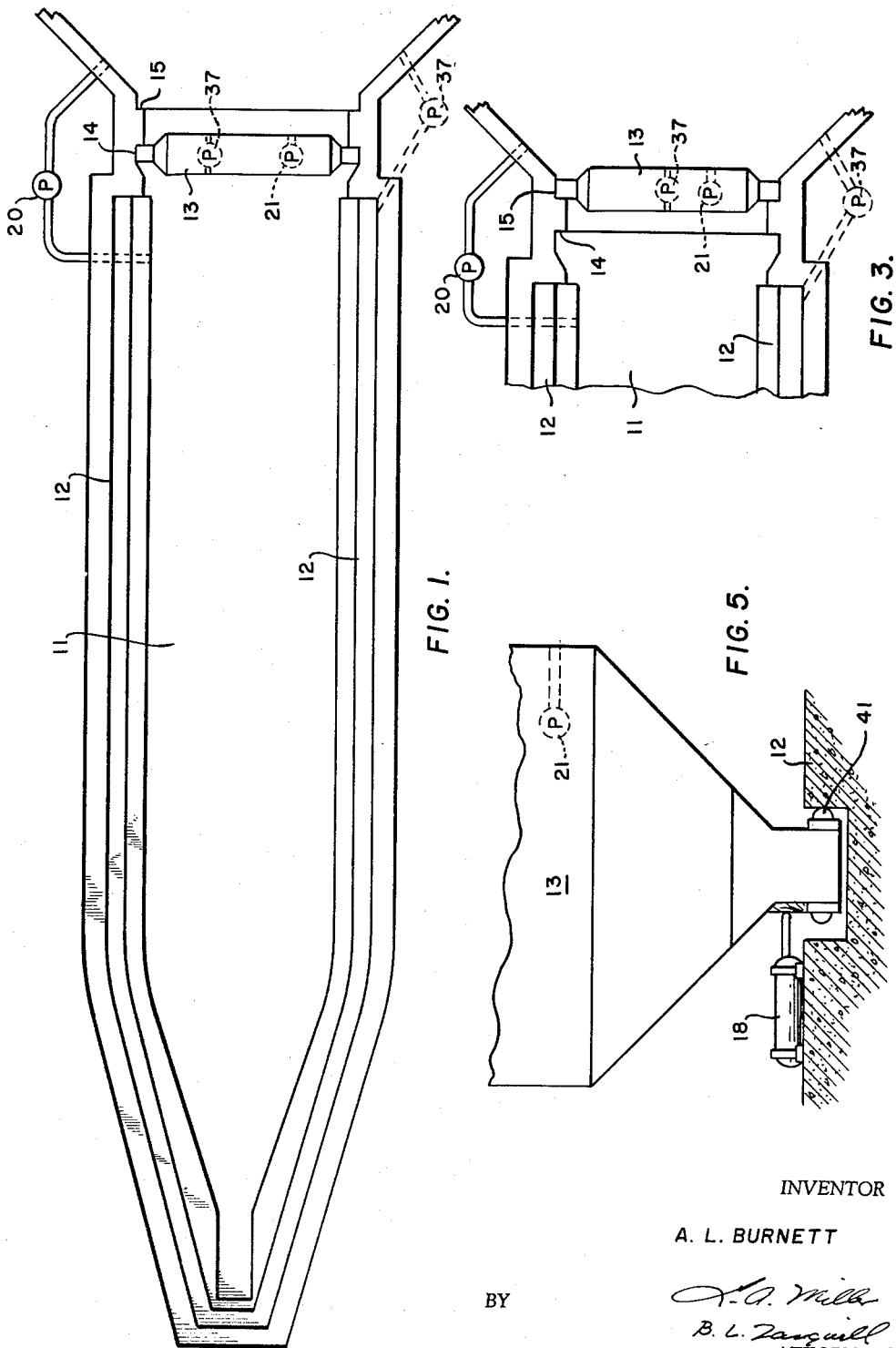

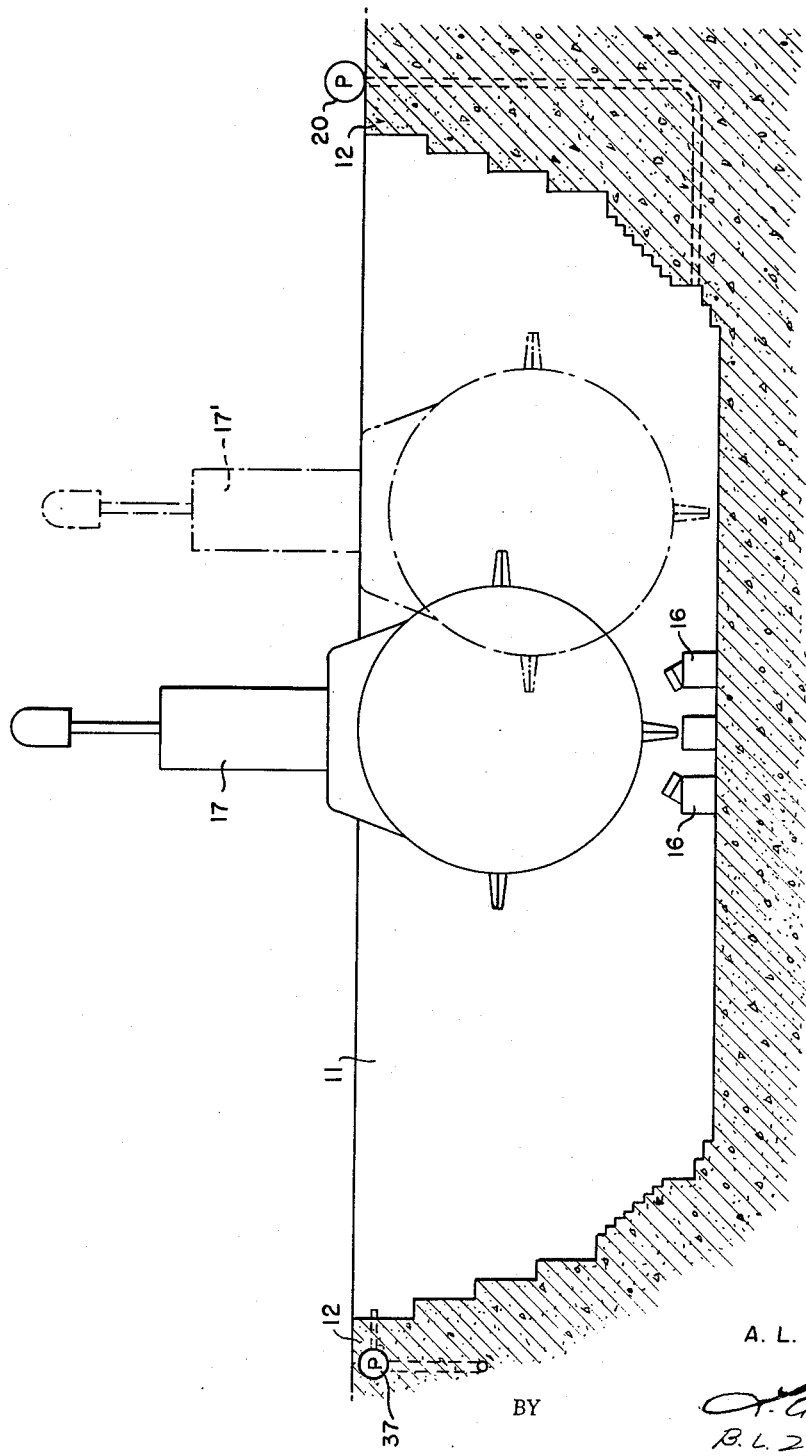

INVENTOR

A. L. BURNETT

BY

ATTORNEYS

May 19, 1964   A. L. BURNETT   3,133,420
METHOD OF DRY-DOCKING A SHIP AND DRY DOCK THEREFOR
Filed April 6, 1960   7 Sheets-Sheet 7

INVENTOR
A. L. BURNETT
BY
ATTORNEYS

3,133,420
METHOD OF DRY-DOCKING A SHIP AND DRY DOCK THEREFOR
Arden L. Burnett, 619 Nicholson St., Falls Church, Va.
Filed Apr. 6, 1960, Ser. No. 20,504
7 Claims. (Cl. 61—64)
(Granted under Title 35, U.S. Code (1952), sec. 266)

The invention described herein may be manufactured and used by or for the Government of the United States of America for governmental purposes without the payment of any royalties thereon or therefor.

The present invention relates to both graving and floating dry docks and more particularly to a system for modifying existing dry dock facilities to allow accommodation of vessels of deeper draft than those for which the dry dock facilities were originally designed.

Many dry docks now in existence were built for ships having a much shallower draft than many modern vessels, and as a result, dry-docking a deep draft vessel for repairs is a very difficult operation and in some instances is impossible.

Conventional graving docks, generally, are excavations adjacent to a body of water and have a gate or caisson for isolating the excavation from the main body of water. A ship or boat in need of repair is floated into the excavation through an open end of the basin, the gate is closed or a caisson is positioned to seal the entrance, the ship is moved over a set of blocks at the bottom of the dry dock, and the water in the excavation or basin is pumped out into the main body of water allowing the ship to rest on the blocks so that repairs can be made. The excavation, obviously, must be large enough and deep enough to accommodate the ship. In the case of deep draft vessels, which are too deep in the water to clear the blocks, the present system of dry-docking is to wait for an extremely high tide and move the vessel in at this time so that it may be positioned over the blocks in the bottom of the dock. It will be realized that when the time comes to again launch the vessel, the launching is again possible only with a sufficiently high tide to allow the ship to be floated higher than the blocks. This system is at best a very time consuming one because it is often necessary to wait for several complete changes of tide for sufficient water depth to dock the vessel and possibly for as great a length of time to again launch the vessel. In the case of a vessel having an extremely deep draft it becomes impossible to place it in the dry dock.

Conventional floating dry docks are generally floating pontoons consisting of a hollow bottom or floor with hollow vertical side walls on each side of the floor or bottom. The area between the two side walls is open as this space or area is used for ship dry-docking and repair. The open area naturally has sufficient length and width to accommodate the vessel's length and breadth. At least one end of the dry dock is open for ship ingress and egress to and from the dry dock and in some cases both ends are open. The ship repair area in existing floating dry docks cannot be used as a water tight basin. The dry dock is lowered in the water by filling the pontoon floor and side wall sections with water and likewise the facility is raised by pumping out the water in the pontoon floor and side walls. A ship or boat in need of repair is floated into the open area between the two side walls after the dock is submerged. The vessel is then aligned in the proper position over the ship's blocks on the floor of the dock and water is pumped out of the pontoon side walls and floor pontoons thereby causing the dock to raise and the vessel is seated on the ship's blocks in a wet slip, pumping of water from the floor and side walls is continued until the entire open floor area of the dock is above the water level of the main body of water at which time the vessel is in the dry.

Many floating dry docks now in existence were built to accommodate ships of much less dead weight or tonnage and having a shallower draft than the present day vessels, and as a result, many modern vessels cannot be dry-docked in them. Since both graving and floating dry docks are very expensive to build, any practical method of increasing the usable water depth of existing facilities or increasing the lifting capacity of existing floating dry docks will result in a great saving in cost.

The present invention is a system for obtaining maximum use of present dry dock facilities with a minimum of cost and time. This is accomplished by providing means for raising the water level in the basin with respect to the level of the surrounding water. In accordance with the present invention there is provided a water tight gate or caisson, across the entrance to the ship repair area or basin, which is designed to keep wtaer in as well as out. Since conventional graving docks have a gate or caisson which is designed to hold water out of the basin, the only necessary change is to provide a second caisson seat for keeping water within the basin. Conventional floating dry docks must be provided with double caisson or gate seats and a caisson or gate to be seated therein, since floating dry docks are normally open-ended. Pumps are provided for pumping water into and out of the dry-docking area and valves may be provided for gravity flow of water when it is desired to transfer water from a higher level to a lower level.

In accordance with the present invention when used in a graving dock, the caisson is removed from the entrance to the basin, and the ship to be dry-docked is warped into the dry dock alongside the blocks upon which it is to rest. The caisson is then moved into the seat which prevents water from leaving the basin and water is pumped in to raise the ship high enough to allow it to clear the blocks. The ship is then moved transversely into position over the blocks, or alternatively, if the ship is of wide beam the blocks are moved transversely into position under the hull of the ship, then valves are opened to allow the water to return to the level of the body of water outside and the ship is seated in a wet slip. The caisson is then reseated in its normal seat and the remaining water is pumped out leaving the ship in the dry. For launching, the basin is allowed to flood, the caisson is moved to its alternate, or inboard seat, and the ship is again raised to allow it to clear the blocks. The ship or the blocks are again moved to give bottom clearance, the water level is lowered to that of the outside water, the caisson is removed and the ship is again ready for service. A single double-face seat may be provided at the entrance as an alternate method and the entire dry-docking operation is performed with the caisson seated in a single seat having two water-tight faces.

When the present invention is used in a floating dry dock, the dry dock is submerged to the desired low water level. The vessel is warped into the dry dock alongside the blocks on which it is to rest and the gates or caissons are moved into the end seats which prevent water from leaving the basin and water is then pumped into the ship repair area to raise the ship high enough to allow it to clear the blocks. The ship is positioned over the blocks or the blocks are moved under the ship and valves are opened to allow the water inside to return to the level of the body of water outside. The water inside of the basin is then pumped dry and the vessel is drydocked. For launching, the basin is allowed to flood to the level of water outside the dock and the dry dock is seated on the channel bottom. The ship is again raised to allow clearance of the ship's bottom and the ship or blocks are moved transversely. The water level is again returned to that of the surrounding water, the gate is removed, and the ship is warped out of the dock.

It will be seen that in addition to the deep draft docking facility acquired by providing gates to close the basin of the floating dry dock, the weight lifting capacity of the dock is also increased. The lifting capacity of present drydocks is limited to not more than the weight of water displaced in the pontoon sections of the floor and side walls. According to the invention the large area in the central portion of the facility used for ship repair will also be watertight by sealing the ends with a gate or caisson. This in effect makes the entire dry dock a hollow pontoon. The water displaced for lifting a vessel thus becomes equal to the entire cube of the drydock less the weight of the drydock itself.

Thus it is an object of the present invention to provide facilities for drydocking deep draft ships at a minimum of cost.

A further object of the invention is the provision of a system for utilizing existing dry dock facilities for drydocking deeper draft ships than those for which the drydock was originally designed.

Another object is to dry-dock heavier ships than the existing dry-docks are designed to dry-dock.

A further object is to operate the dry dock deeper in the water than is now possible to counteract increased vessel tonnage in docking heavier ships.

Still another object is to provide a system for drydocking deep draft vessels in a minimum of time.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a top view of a graving dock utilizing the present invention;

FIG. 2 is an end view of the embodiment shown in FIG. 1 and showing a ship positioned in the basin;

FIG. 3 is a fragmentary view of the embodiment shown in FIG. 1 and shows a caisson positioned to seal out water external to the basin;

FIG. 5 is a fragmentary top view of the embodiment shown in FIG. 4;

FIG. 7 is a top view of a floating dry dock having two open ends and utilizing the present invention;

FIG. 8 is a top view of a floating dry dock having one open end and utilizing the present invention;

FIG. 10 is a fragmentary view of the embodiment shown in FIG. 7 showing the caisson positioned to seal water within the basin at a higher level than the water outside the basin;

FIG. 11 is a fragmentary view in greater detail of the embodiment shown in FIG. 10;

Figure 4:
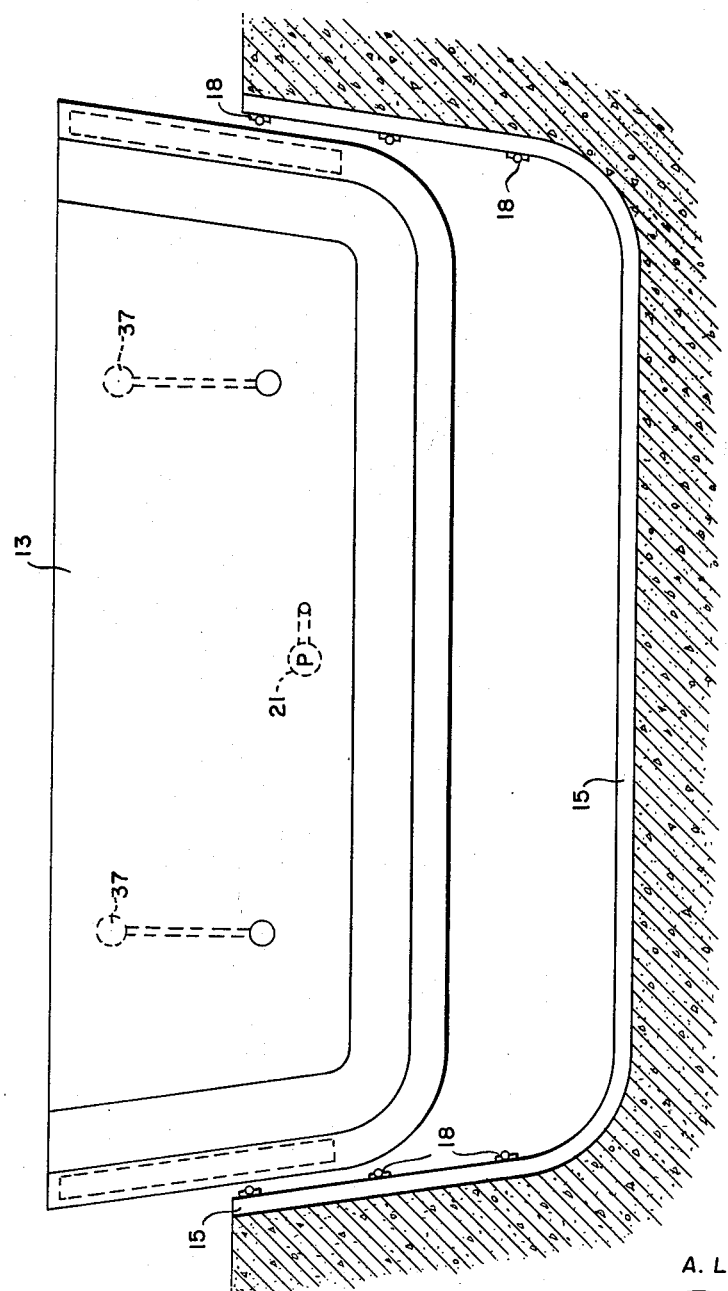
FIG. 4 is an enlarged end view of an alternative embodiment of the invention wherein a double faced caisson seat is provided.

Referring now to the drawings, wherein like reference characters designate like or corresponding parts throughout the several views, there is shown in FIG. 1 a basin 11 enclosed by walls 12 surrounding the basin on three sides and a caisson 13 positioned across the remaining side.

The caisson 13 is hollow and is adapted to be filled with water or drained as desired by operation of a pump 21. The walls and floor of the basin 11 are watertight to prevent seepage of water in or out. A plurality of blocks 16 (FIGS. 2 and 6) are positioned on the floor of the basin to support the hull of the ship which is to be dry-docked. Pumps 20 and 37 are provided for pumping water into and out of basin 11.

Figure 15:
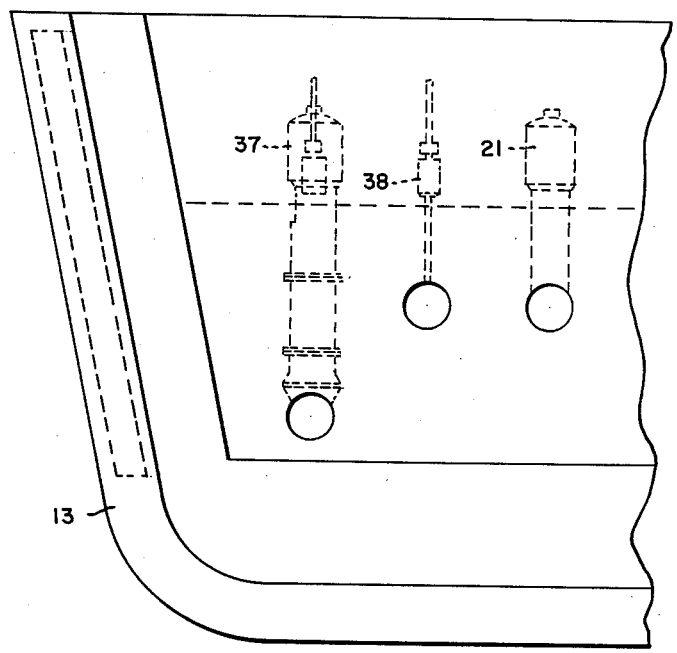
FIG. 15 is a side view of the caisson shown in FIG. 14.
Figure 14:
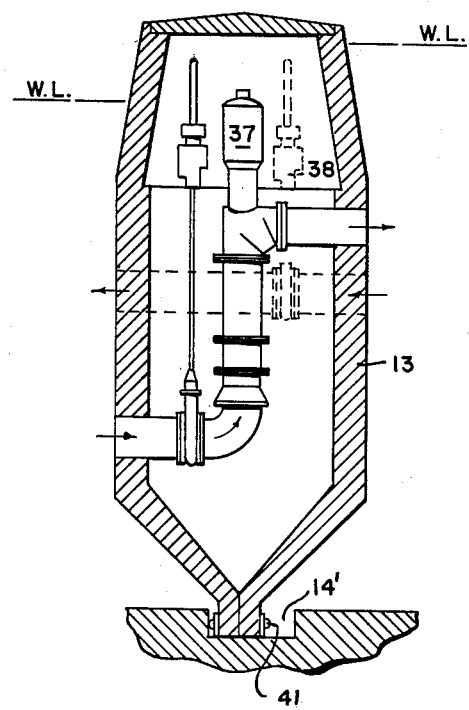
FIG. 14 is a transverse sectional view through a caisson showing a typical pump installation for the caissons of any of the embodiments shown in FIGS. 1–13.

A typical pumping arrangement for raising and lowering the water level within the basin or ship repair area of either a floating or graving dry dock is shown in FIGS. 14 and 15. In addition to pump 21, which is used to pump water into the caisson 13. A valve 38 is also provided to allow the water level within the basin to be lowered to that of the water outside without the necessity of pumping. It will be realized that pump 37 may be omitted and a system of valves may be provided on pump 21 to allow pump 21 to be used both for raising or lowering the level of water in the basin. Other variations will be obvious to those skilled in the art and it is to be realized that the embodiment shown in FIG. 14 and FIG. 15 is merely exemplary.

Referring again to FIGS. 1 and 3, the open end of basin 11 has a pair of caisson seats 14 and 15. An outboard seat 15 is provided to keep water out of the basin while the inboard seat 14 is provided to alternatively keep water in the basin at a higher level than the outside. As can be seen in FIG. 4, the caisson seats are shaped to conform to the shape of the caisson 13.

The dry-docking operation for graving docks utilizing the present invention is as follows: First, the caisson is made floatable by pumping water out of it. This raises the caisson out of its seat and it is floated out of the way. The dry-dock now contains water to a depth equal to that of the surrounding water. If the vessel to be docked is of shallow draft, it is warped into position over blocks 16 and the caisson is warped into outboard seat 15 and sunk. The basin is thus sealed by water pressure on the outboard side of the caisson and the basin may be pumped dry allowing the ship to settle on the blocks 16. The dry-dock is thus used in the conventional manner.

Figure 6:
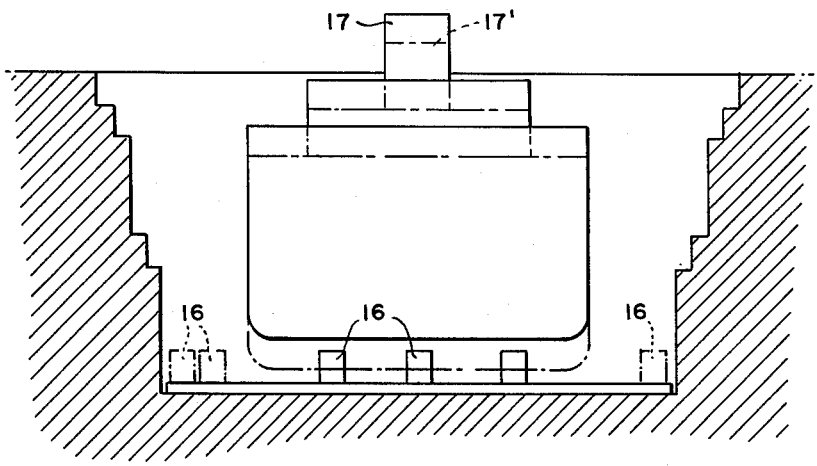
FIG. 6 is an end view of the embodiment shown in FIG. 1 showing the positions of a ship relative to sliding blocks on the basin floor.
Figure 12:
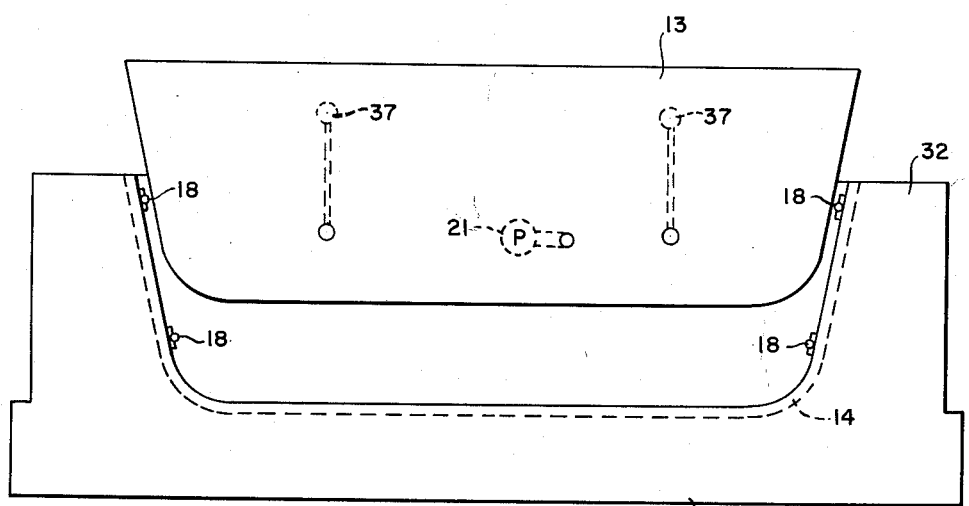
FIG. 12 is an end view of the embodiment shown in FIG. 9 showing the caisson before seating.

However, if the ship to be docked has a draft which will not allow the ship to clear the blocks as it is warped into the basin an alternative procedure is required. The blocks 16 are placed in a position to allow the ship to be warped into the basin alongside the blocks. This may be accomplished as shown in FIG. 2 wherein the blocks 16 remain in a fixed position, if the ship is narrow compared to the dock width, or alternatively, if the ship is too wide, the blocks 16 may be slid to the sides of the basin as illustrated in FIG. 6. When the ship is in the basin, the caisson 13 is warped into the inboard caisson seat 14 and sunk to seal the basin. Water is pumped into the basin to raise the water level to the height required to allow the ship to be positioned over the blocks 16. After the ship is positioned over the blocks, either by moving the ship sideways as illustrated in FIG. 2 where the broken profile 17' illustrates the original position and the solid profile 17 represents the final position of the ship, or by sliding the blocks under the hull as illustrated in FIG. 6 wherein the solid profile of the ship and blocks represent the final position, flood holes or valves are opened and the level of water inside the basin is allowed to return to that outside. The caisson is raised, moved to the outboard seat 15, and reseated; whereupon the basin is pumped dry and the ship settles on the blocks.

When repairs have been completed the ship is removed from the dry-dock by reversing the docking procedure. First, the basin is flooded to the level of the outside water and the caisson is raised, warped to the inboard seat, and reseated. Water is pumped into the basin to raise the vessel clear of the blocks and the vessel is moved into position alongside the blocks. The water level is again lowered to that outside, the caisson is removed, and the ship is floated out of the basin.

FIG. 5 shows details of a modification of the caisson seating arrangement wherein a single channel shaped seating slot 14' is provided for seating the caisson in either the inboard or outboard position. This provides for moving the caisson from one position to another without raising it completely thereby allowing the entire dry-docking operation from a single channel shaped double-faced seat. In this case a plurality of rams 18, positioned at spaced points around the inboard seat, may be provided to force a watertight seal between the caisson and the outboard caisson seat. A pair of sealing strips 41 are provided on each of the seating faces of the caisson 13 in order to provide a watertight seal between the caisson 13 and seat 14', when the caisson is positioned against either the outboard or the inboard seat of channel-shaped seat 14'. It will be realized that the functions of the outboard seat and inboard seat are reversed in this embodiment since the seats face in opposite directions from those shown in FIG. 1. However, the overall effect is the same since the caisson may be positioned to either seal water into the basin or seal it out as required.

In FIG. 7–13, the invention is shown as utilized in a floating dry dock. FIG. 7 illustrates a type of floating dry-dock which has two open ends, while FIG. 8 shows a floating dry-dock of the type which has just one open end. In each case the application of the present invention is identical except that the embodiment shown in FIG. 7 requires duplicate caissons and caisson seating equipment; one set being installed at each end. Referring now to FIGS. 7–13, there is shown a basin 31 enclosed by walls 32 on both sides of the basin and caisson or caissons 13 across the open end or open ends of the basin. Pumps 21 are provided in the caissons for pumping water from the caissons to raise them out of their seats.

The caissons 13, side walls 32, and floor 35 (FIG. 9) are hollow and are adapted to be filled with water or drained as desired. Pumps 33 are provided for emptying water from the side walls and floor. The walls, caissons and floor of basin 31 are watertight to prevent seepage of water in or out as required. A plurality of blocks 16 are again provided on the basin floor to support the hull of the vessel to be dry-docked.

Figure 13:
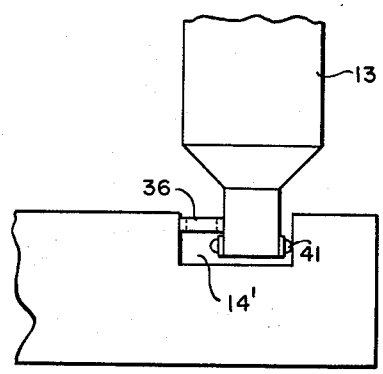
FIG. 13 is a fragmentary view of an alternative seating arrangement for the caisson.

Double faced channel shaped caisson seats 14' are provided for seating the caisson and the seats may again be provided with a plurality of rams 18. FIG. 13 shows an alternative seating arrangement wherein a wedge 36 is provided in place of the rams for sealing the caisson against the outboard seating face. This arrangement may obviously be applied to both graving docks and floating docks.

The dry-docking operation utilizing the present invention in floating docks is initiated by pumping the water from the caisson to raise it from its seat and allow it to be floated out of the way. The dry-dock is sunk to the desired level by allowing the walls and floor to fill with water. If the vessel to be docked is of shallow draft and of small enough tonnage to be handled by the existing dock, the vessel is then warped into position over blocks 16 and the water is pumped out of the side walls 32 and floor 35 allowing the dry-dock to rise seating the vessel and raising it above the level of the surrounding water. In this manner the ship is used as a conventional floating dry-dock.

Figure 9:
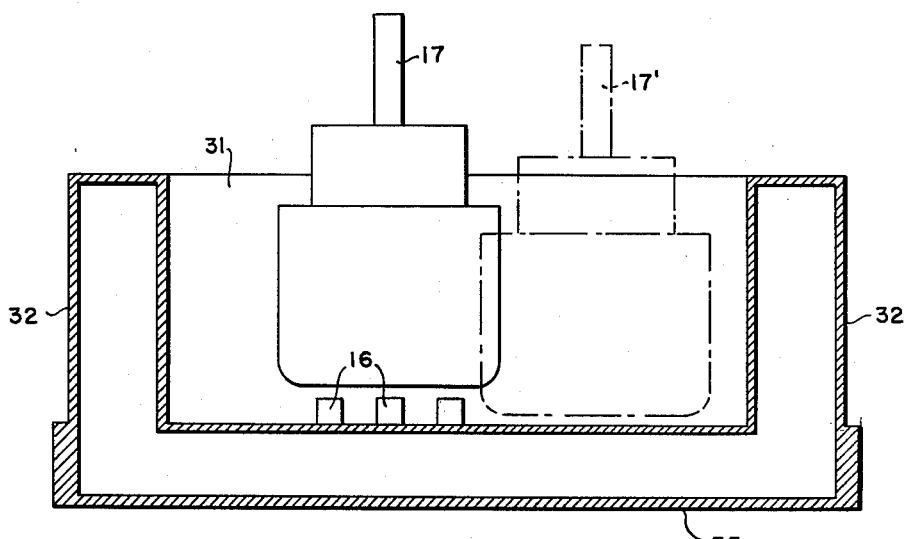
FIG. 9 is an end view of a floating dry dock showing the position of a ship in the dock.

If the ship to be docked has a draft which will not allow the ship 17 to clear the blocks as shown at 17' in FIG. 9 or if the lifting capacity of the dock is not adequate for raising the ship above the level of the surrounding water, an alternate procedure must be used. The blocks 16 are placed in a position to allow the ship to be moved into the basin alongside the blocks. Water fills the voids in the floor 15 and the side walls 12 and the dock is allowed to reset on the bottom of the river or channel. When the ship is in the basin, caisson 13 is warped into the caisson seat 14' and sunk to seal the basin. Water is pumped into the basin to raise the water level to the height required to allow the ship to be positioned over blocks 16 or alternatively for the blocks 16 to be moved under the ship. When the vessel is in position relative to the blocks, the level of water inside the basin is allowed to return to that outside. Basin 31 is then pumped dry and the ship settles on the blocks in the dry-dock.

When repairs have been completed the ship is removed from the dry-dock by flooding the basin causing the basin to again rest on the bottom of the river or channel. Water is pumped into the basin to raise the vessel clear of the blocks and the vessel is moved into position alongside the blocks or the blocks are moved from under the ship. The water level is again lowered to that outside, the caisson is removed, and the ship is floated out of the basin.

The invention, as described, allows drydocking of deep draft vessels in dry docks designed for vessels having a much shallower draft. The invention also allows existing docks to lift heavier ships than they were designed to lift. Thus existing facilities can be altered to accomodate deep draft vessels or additional vessel tonnage at a minimum of expense.

It will be realized that many modifications of the present invention are possible. The placement of the caisson seats may be varied. A swing out or in gate may be used instead of a floating caisson. The shape of the dock as shown in the drawings is merely for illustrative purposes and may have any desired configuration. The pumps have been shown diagrammatically and it will be realized that they may be installed in the caisson or gate or alternatively in the dry-dock side walls with intake and discharge lines positioned as required.

Obviously many other modifications and variations of the present invention are possible in the light of the above teachings. It is therefore to be understood that within the scope of the appended claims the invention may be practiced otherwise than as specifically described.

What is claimed is:

1. A method for utilizing a dry dock for dry-docking ships, said dock being of the type including an open ended basin defined by opposed side walls and interconnecting end wall and floor and having ship supporting blocks positionable on the floor thereof comprising the steps of moving the blocks on the dock basin floor to either side of the basin, warping the ship into the basin alongside the blocks with the ship's bottom being lower than the tops of the blocks, floating a caisson into the open end of said basin, seating said caisson in a caisson seat provided in the open end of said basin in a manner to seal water within said basin, raising the water level within said basin sufficiently high to raise the ship's bottom higher than the tops of said blocks, moving said blocks under water to their supporting positions under the ship, lowering the level of the water in the basin to the level of water external to the dock, floating the caisson to another caisson seat, seating the caisson in a manner to form a watertight seal against water external to said basin, and removing the remaining water from said basin whereby the ship is supported on said blocks.

2. A method for utilizing a dry dock for dry-docking ships, said dock being of the type including an open ended basin defined by opposed side walls and interconnecting end wall and floor and having ship supporting blocks positionable on the floor thereof comprising the steps of pre-positioning movable ships blocks on the dock basin floor to either side of the basin, warping the ship into the basin alongside the blocks with the ship's bottom being lower than the tops of the blocks, floating a caisson into the open end of said basin, seating said caisson in a caisson seat provided in the open end of said basin in a manner to seal water within said basin, raising the water level within said basin sufficiently high to raise the ship's bottom higher than the top of said blocks, moving the ship transversely into docking position over the blocks, lowering the level of the water in the basin to the level of water external to the dock, floating the caisson to another caisson seat, seating the caisson in a manner to form a water-tight seal against water external to said basin, and removing the remaining water from said basin whereby the ship is supported on said blocks.

3. A dry dock comprising in combination:
 (1) an open ended basin defined by opposed side walls connected by an end wall and an interconnecting floor;
 (2) a floatable caisson including a peripheral seating portion for closing the opposite end of said basin;
 (3) means on said side walls and floor opposite said end wall and forming a pair of continuous oppositely facing seats for said caisson, one of said seats facing said end wall, the spacing between said seats being substantially greater than the thickness of the peripheral seating portion of said caisson;
 (4) pumping means for raising the level of water in said basin above the outside water level while said peripheral seating portion of said caisson is removably seated against said one seat and for emptying the water from said basin while said peripheral seating portion of said caisson is removably seated against the other of said seats.

4. The combination defined by claim 3 and further including means for positively seating said caisson against said one of said seats.

5. The combination defined by claim 4 in which said last mentioned means comprises a plurality of hydraulic rams anchored to the floor of said dry dock adjacent said caisson seats.

6. The combination defined by claim 5 wherein a sealing strip is positioned between said caisson and said seats to insure a watertight seal therebetween.

7. A combination defined by claim 3 in which said pumping means are located within said caisson.

References Cited in the file of this patent

UNITED STATES PATENTS

| | | |
|---|---|---|
| 2,442 | Hill | Feb. 1, 1842 |
| 210,185 | Clark et al. | Nov. 26, 1878 |
| 843,355 | Overton | Feb. 5, 1907 |
| 1,349,992 | Williams | Aug. 17, 1920 |
| 1,376,345 | Lawton | Apr. 26, 1921 |
| 2,240,049 | Murphy | Apr. 29, 1941 |
| 2,311,666 | Kalix | Feb. 23, 1943 |
| 2,568,751 | Larsen | Sept. 25, 1951 |

FOREIGN PATENTS

| | | |
|---|---|---|
| 25,970 | Great Britain | of 1901 |
| 364,706 | France | June 8, 1906 |
| 3,630 | Great Britain | of 1910 |
| 29,365 | Norway | Jan. 20, 1919 |